(12) United States Patent
Gjerdrum et al.

(10) Patent No.: US 12,222,945 B2
(45) Date of Patent: Feb. 11, 2025

(54) FEDERATED GRAPH QUERIES ACROSS HETEROGENEOUS DATA STORES

(71) Applicant: Microsoft Technology Licensing, LLC, Redmond, WA (US)

(72) Inventors: Anders Tungeland Gjerdrum, Tromso (NO); Theodoros Gkountouvas, Tromso (NO); Jan-Ove Almli Karlberg, Tromso (NO)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/314,627

(22) Filed: May 9, 2023

(65) Prior Publication Data

US 2024/0378203 A1    Nov. 14, 2024

(51) Int. Cl.
*G06F 7/00*     (2006.01)
*G06F 16/00*    (2019.01)
*G06F 16/2453*  (2019.01)
*G06F 16/2455*  (2019.01)
*G06F 16/248*   (2019.01)

(52) U.S. Cl.
CPC .... *G06F 16/2455* (2019.01); *G06F 16/24542* (2019.01); *G06F 16/248* (2019.01)

(58) Field of Classification Search
None
See application file for complete search history.

(56) References Cited

U.S. PATENT DOCUMENTS

| | | | |
|---|---|---|---|
| 9,633,073 B1 | 4/2017 | Allen | |
| 11,604,799 B1* | 3/2023 | Bigdelu | G06F 3/0484 |
| 2021/0117232 A1* | 4/2021 | Sriharsha | G06F 16/1734 |
| 2023/0229666 A1* | 7/2023 | Kramer | G06F 16/27 |
| | | | 707/646 |

OTHER PUBLICATIONS

International Search Report and Written Opinion received for PCT Application No. PCT/US2024/028448, Aug. 16, 2024, 12 pages.

* cited by examiner

*Primary Examiner* — Tuan A Pham
(74) *Attorney, Agent, or Firm* — Foley IP Law, PLLC (57) ABSTRACT

Solutions are disclosed that enable efficient federated graph queries across multiple isolated data stores. Examples leverage the connectedness of the expected data that spans the data stores by defining the entities and relationships and inferring the intent of the queries. These are used to optimize data searches in the individual data stores. Examples map each of two or more variables of the input query to elements of a public schema and use the mapping to determining a storage tag (identifying a data store) for each of the variables of the input query. Store-specific queries are scheduled and performed based on at least the storage tags.

20 Claims, 10 Drawing Sheets

```
+Return [ $0 AS anon_0, $1 AS anon_1, $2 AS anon_2, $3 AS anon_3, $4 AS anon_4 ]
|
+Materialize[ $0,$1,$2,$3,$4 ]
|
+Where[ ($1._Schema.Name IS NOT NULL )
  AND ($0._Schema.DogName IS NOT NULL )
  AND ($0._Schema.Paws IS NOT NULL )
  AND ($2._Schema.DogName IS NOT NULL )
  AND ($2._Schema.Paws IS NOT NULL )
  AND ($3._Schema.Name IS NOT NULL )
  AND ($4._Schema.DogName IS NOT NULL )
  AND ($4._Schema.Paws IS NOT NULL ) ]
|
+Expand [ ( ) , ($2 ) - [$3:] ->($4), $3 : Properties: (_Schema ), $4 Properties: (_Schema ) ]
|
+Expand [ ( ) , ($0 ) - [$1:] ->($2), $1 : Properties: (_Schema ), $2 Properties: (_Schema ) ]
|
+AllNodes [ $0 ]
```

```
a -> unique properties found
b -> list of tags and properties of each
GetStorageTags(a, b)
    var c = [];
    while a and b have elements:
        (tag, m) = max(b);
        for each value in m:
            if a contains value:
                add (value, tag) to c;
                remove value from a;
        remove (tag, m) from b;
    return c;
```

FIG. 8

```
a -> mapping from variable to schema entity/relationship
b -> mapping from variable to minimal set of tags.
q -> query
Assign(a, b, q):
    for each d in q:
        c = getMappings(a[d]);
        for each m in c:
            if b[d] = m:
                setTag(d, b[d])
```

FIG. 9

```
+Sequence
| \
| [1] : <Store2>
| |
| +Return[ $8 AS r.Name,$9 AS a.DogName,$10 AS a.Paws,$11 AS b.DogName,$12
AS b.Paws,$13 AS c.DogName,$14 AS c.Paws,$15 AS rl1Name ]
| |
| +Materialize[ $8 := $1.Name,$9 := $0.Name,$10 := $0.Paws,$11 := $2.Name,$12 :=
$2.Paws,$13 := $4.Name,$14 := $4.Paws,$15 := $3.Name ]
| |
| +MergeEntities[ $0, $7 ]
| |
| +NodeById[ $7, ids:$0.Identifier, Properties: (DogName) ]
| |
| +MergeEntities[ $2, $6 ]
| |
| +NodeById[ $6, ids:$2.Identifier, Properties: (DogName) ]
| |
| +MergeEntities[ $4, $5 ]
| |
| +NodeById[ $5, ids:$4.Identifier, Properties: (DogName) ]
| |
| +Input[ $0, $1, $2, $3, $4 ]
| \
[0] : <Store1>
 |
 +Output[ $0, $1, $2, $3, $4 ]
 |
 +Expand[ (), ($2) - [$3:FriendOf]->($4), $3 Properties: (Name), $4 Properties: (Paws,
Identifier) ]
 |
 +Expand[ (), ($0) - [$1:FriendOf]->($2) , $1 Properties: (Name), $2 Properties: (Paws,
Identifier) ]
 |
 +NodeById[ $0, ids:1, Properties: (Paws, Identifier) ]
```

FEDERATED GRAPH QUERIES ACROSS HETEROGENEOUS DATA STORES

BACKGROUND

Some organizations may have large amounts of valuable data sitting in multiple isolated data stores that have differing storage schemes. The traditional routes to accessing unformatted or disparately-formatted data are: copying the data into a new location with a schema on write implementation, or developing a schema on read arrangement. Schema-on-write is expensive for large amounts of data, and traditional schema-on-read works well when the data is located in a data store that is accessed as a single logical location (even if physically dispersed).

SUMMARY

The disclosed examples are described in detail below with reference to the accompanying drawing figures listed below. The following summary is provided to illustrate some examples disclosed herein.

Example solutions for federated graph queries across heterogeneous data stores include: receiving an input query; mapping each of two or more variables of the input query to elements of a public schema; using the mapping of the variables of the input query to the elements of the public schema, determining a storage tag for each of the variables of the input query, each storage tag identifying a data store of a set of multiple data stores; based on at least the storage tags, performing a first store-specific query; and returning a query result based on at least the first store-specific query.

BRIEF DESCRIPTION OF THE DRAWINGS

The disclosed examples are described in detail below with reference to the accompanying drawing figures listed below.

Corresponding reference characters indicate corresponding parts throughout the drawings.

DETAILED DESCRIPTION

When valuable data is dispersed across multiple isolated data stores, a federation layer is able to provide a manifestation of a meta-graph that may be queried with simplified queries from users. The federation layer handles the process of identifying the data stores from which to retrieve information, as well as compiling the retrieved information into a coherent result to return.

However, federation across the data stores requires that a query planner receives sufficient information about the intent of the query to ensure correct scheduling of store-specific queries (i.e., the queries sent to each of the data stores from which information is retrieved). The query intent should be specified through the query language itself, through span predicates and select/filter statements. Unfortunately, some queries, such as open-ended queries, have vaguely specified intent and scheduling store-specific queries may be challenging.

An example scenario is provided to use for explaining advantages of the disclosure: An organization produces multiple different products and its customers each tend to employ multiple ones of the different products. An example is a first user editing a file with one software product, collaboratively editing or reviewing that file with a second user with another software product, and then the first or second user distributing and/or publishing that file using yet another software product.

Data regarding the product usage is collected independently for each product, and stored in disparate locations in widely-varying formats, with different organizational schemes for the data in the different locations, and in some cases, with different organizational schemes within a single location. This situation may have developed as a result of changing information collection practices over times, due to the organization's policy and/or regulatory requirements changing over time. Additionally the organization may operate in differing geographical regions in which data collection practices differ from each other, in addition to changing over time.

The organization intends to more fully integrate some of the different products, and so could benefit from generating coherent representations of a typical single user's experience with multiple ones of the products. Using traditional techniques, this would require either copying the data into a new database using an expensive schema on write effort, or cobbling the data together using a custom data mining scheme that is tailored to that single task. Any additional data mining tasks will require generating a new custom data mining schema. This second approach takes time and does not scale well to leverage the data for different projects.

Using the disclosure enables more efficient data retrieval and analysis for different and changing projects. Using aspects of the disclosure, an example simple data query that could be supported across heterogeneous data stores is:

MATCH (user)-[Modified]→(file)<-[:Modified]-(another_user) RETURN user.ProfileName, another_user.ProfileName Solutions are disclosed that enable efficient federated graph queries across multiple isolated data stores. Examples leverage the connectedness of the expected data that spans the data stores by defining the entities and relationships and inferring the intent of the queries. These are used to optimize data searches in the individual data stores. Examples map each of one or more variables of the input query to elements of a public schema and use the mapping to determining a storage tag (identifying a data store) for each of the variables of the input query. Store-specific queries are scheduled and performed based on at least the storage tags.

The example solutions described herein reduce computational burdens by permitting a federation layer to efficiently access data spread across multiple isolated data stores. This precludes the need for a burdensome schema-on-write arrangement that would double the required storage, or a query scheme that inefficiently (and unnecessarily) queries each of the data stores in turn, to locate all of the data. Examples accomplish the advantageous performance benefits by at least, using a mapping of variables of an input query to elements of a public schema, determining a storage tag for each of the variables of the input query.

The various examples will be described in detail with reference to the accompanying drawings. Wherever preferable, the same reference numbers will be used throughout the drawings to refer to the same or like parts. References made throughout this disclosure relating to specific examples and implementations are provided solely for illustrative purposes but, unless indicated to the contrary, are not meant to limit all examples.

Figure 1:
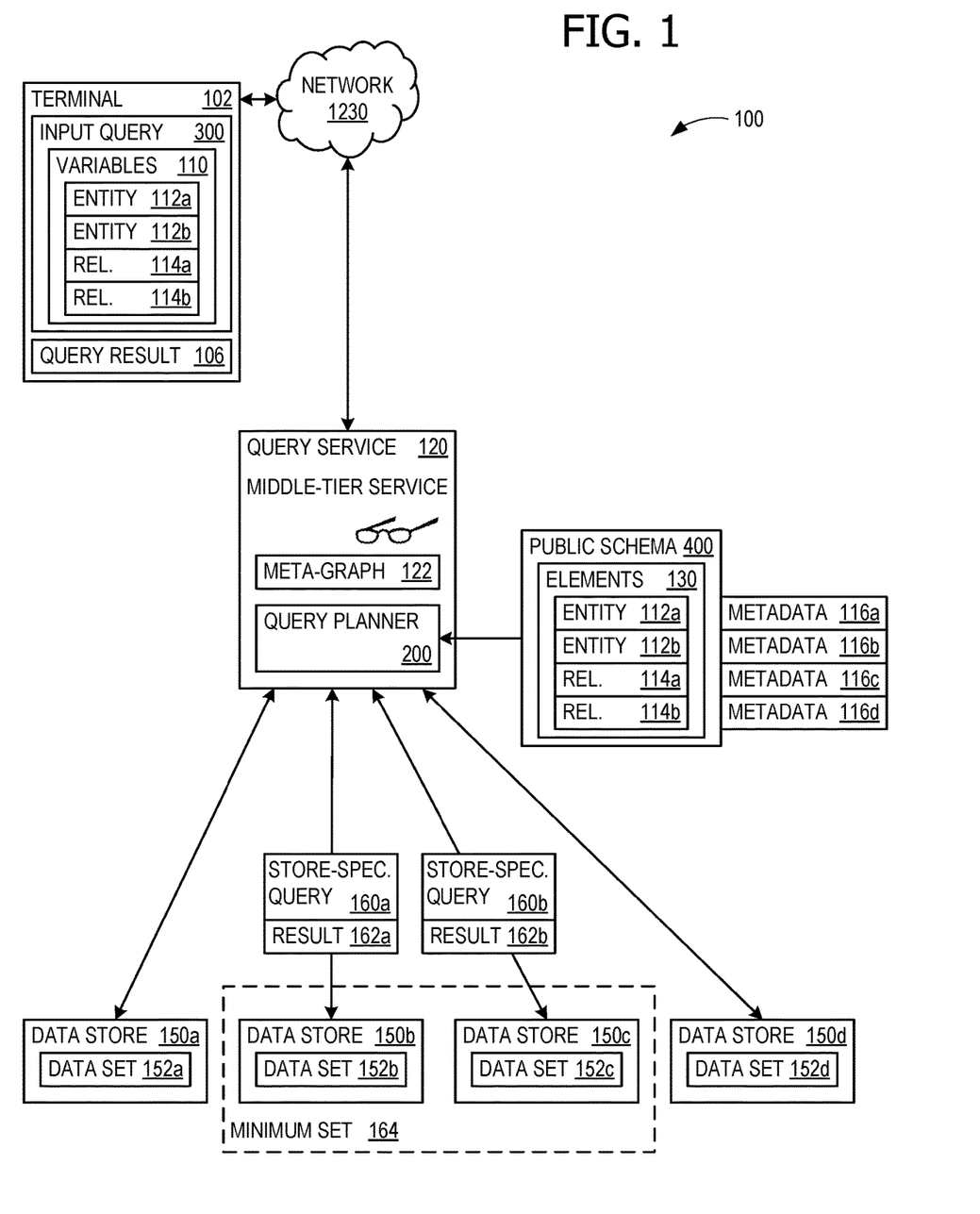
FIG. 1 illustrates an example architecture that advantageously provides federated graph queries across heterogeneous data stores.

FIG. 1 illustrates an example architecture 100 that advantageously provides federated graph queries across heterogeneous data stores. A user terminal 102 transmits an input query 300 to a query service 120 across a network 1230 (e.g., the internet, or another computer network) and receives a query result 106 in response. Query service 120 acts as a federation layer that enables graph queries across isolated data stores 150a-150d, and provides a middle tier service. A middle tier service provides processing between a user terminal (e.g., user terminal 102) and a database server. Data stores 150a-150d provide database servers, but may be heterogeneous, with disparate data storage schemes.

Query service 120 permits user terminal 102 to query data sets 152a-152d, within data stores 150a-150d, to be queried as if a graph existed. That is, even though data sets 152a-152d may not be arranged as a graph (e.g., with entities or nodes, and relationships or edges), query service 120 presents data sets 152a-152d as an apparent graph, or a meta-graph 122, using a public schema 400.

Figure 3:
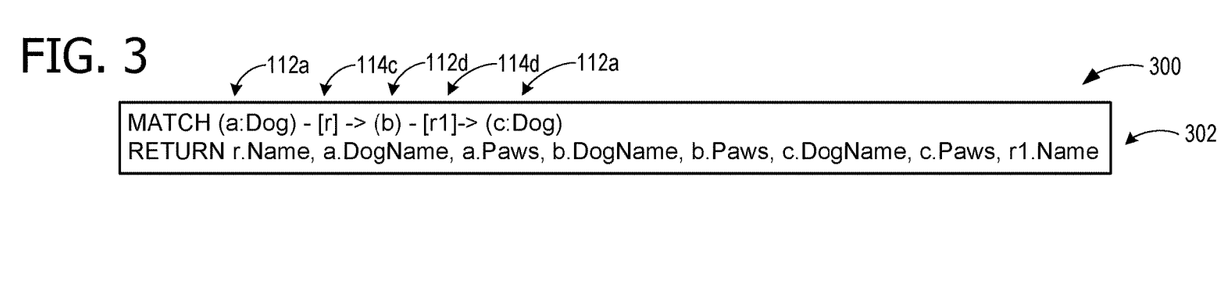
FIG. 3 illustrates an example input query; such as may be used in the example architecture of FIG. 1.
Figure 4:
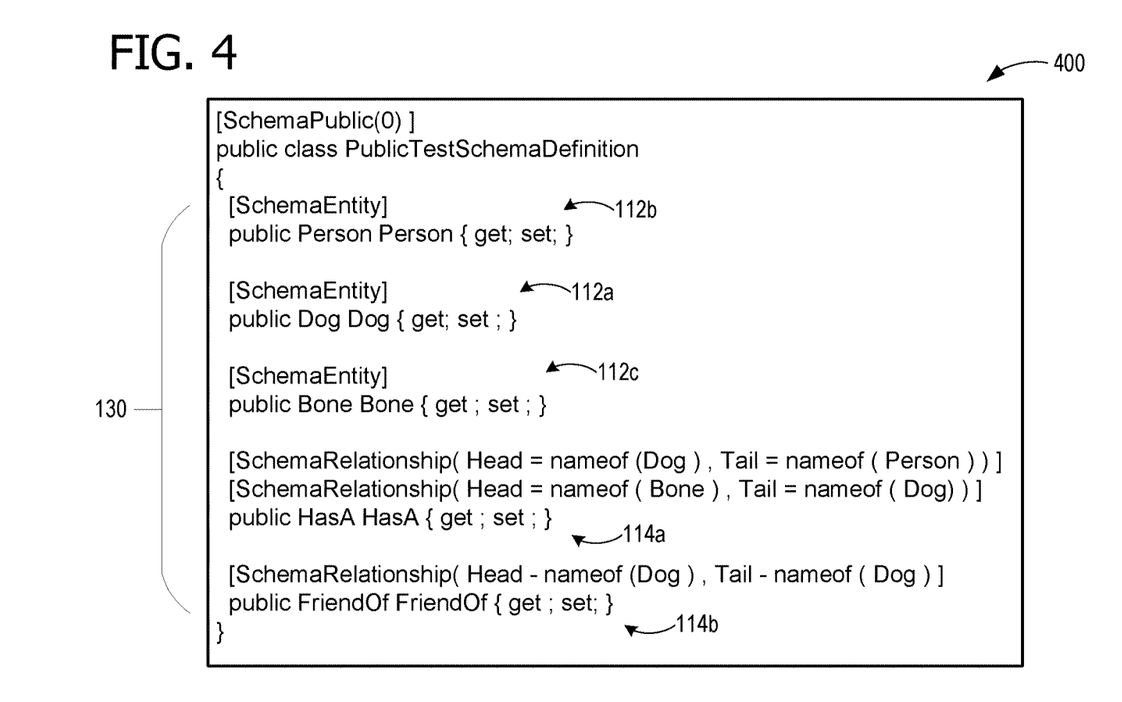
FIG. 4 illustrates an example public schema; such as may be used in the example architecture of FIG. 1.

Input query 300 has a set of variables 110 comprising entities and relationships that are drawn from elements 130 of public schema 400. The entities and relationships within input query 300 may be specified (i.e., a variable is identified as a specific entity) or placeholders (i.e., a variable is not specified, and so will be inferred, as described below). Public schema 400 indicates types, connectedness, and/or storage locations of variables 110. Elements 130 and variables 110 are illustrated as comprising at least an entity 112a, an entity 112b, a relationship 114a, and a relationship 114b, although it should be understood that some examples use a larger number of elements and variables. Variables are placeholders in the submitted query, which can be interpreted as entities, relationships, or properties. Relationships are connections between two entities that are adjacent in a graph (or a meta-graph), defined with a distinct type and direction. Entities are likewise defined with a distinct type. Entities and relationships both have a set of properties attached, defined as a key-value pair. An example of input query 300 is shown in FIG. 3, and an example of public schema 400 is shown in FIG. 4.

Some examples use OpenCypher as the query language for input query 300, although other query languages may be used. Requirements for the query language include that it is able to define and specify a graph span, and select, filter, and process the graph span. That is, the query language should be able to express a predicate to restrict the candidate graph through specific entity and relationship types, and the expected connectedness between them. The query language should also be able to filter and process on select data and specify explicitly what information to return.

Public schema 400 also has metadata associated with elements 130, such as metadata 116a for entity 112a, metadata 116b for entity 112b, metadata 116c for relationship 114a, and metadata 116d for relationship 114b. Metadata 116a-116d for elements 130 may include cardinality, access control information, privacy classification, expected data store latency, and overlap of data sets 152a-152d. Some metadata, such as latency, may be dynamically probed and updated at runtime.

In the example shown in FIG. 1, four data stores are used, although it should be understood that some examples use a different number of data stores. A query planner 200, which is illustrated in further detail in FIG. 2, transmits store-specific queries to a set of selected data stores. In the illustrated example, query planner 200 sends a store-specific query 160a to data store 150b and a store-specific query 160b to data store 150c. Data store 150b returns a query result 162a after searching data set 152b based on store-specific query 160a, and data store 150c returns a query result 162b after searching data set 152c based on store-specific query 160b. Query result 162a and 162b, which are store-specific, are compiled into an aggregated result for return to user terminal 102 as query result 106.

In this example, query planner 200 had determined that the data necessary to satisfy input query 300 was within data sets 152b and 152c. Some or all of the data may also be located within data store 150a (e.g., within data set 152a) and/or within data store 150d (e.g., within data set 152d), however data stores 150a and 150d were not selected for searching by query planner 200. This non-selection may be due to overlap and/or higher latencies for the non-selected data stores. In some examples, query planner 200 attempts to identify the minimum number of data stores to search, in which to find the responsive data. In this illustrated example, a minimum set of data stores 164 includes only data stores 150b and 150c.

Figure 2:
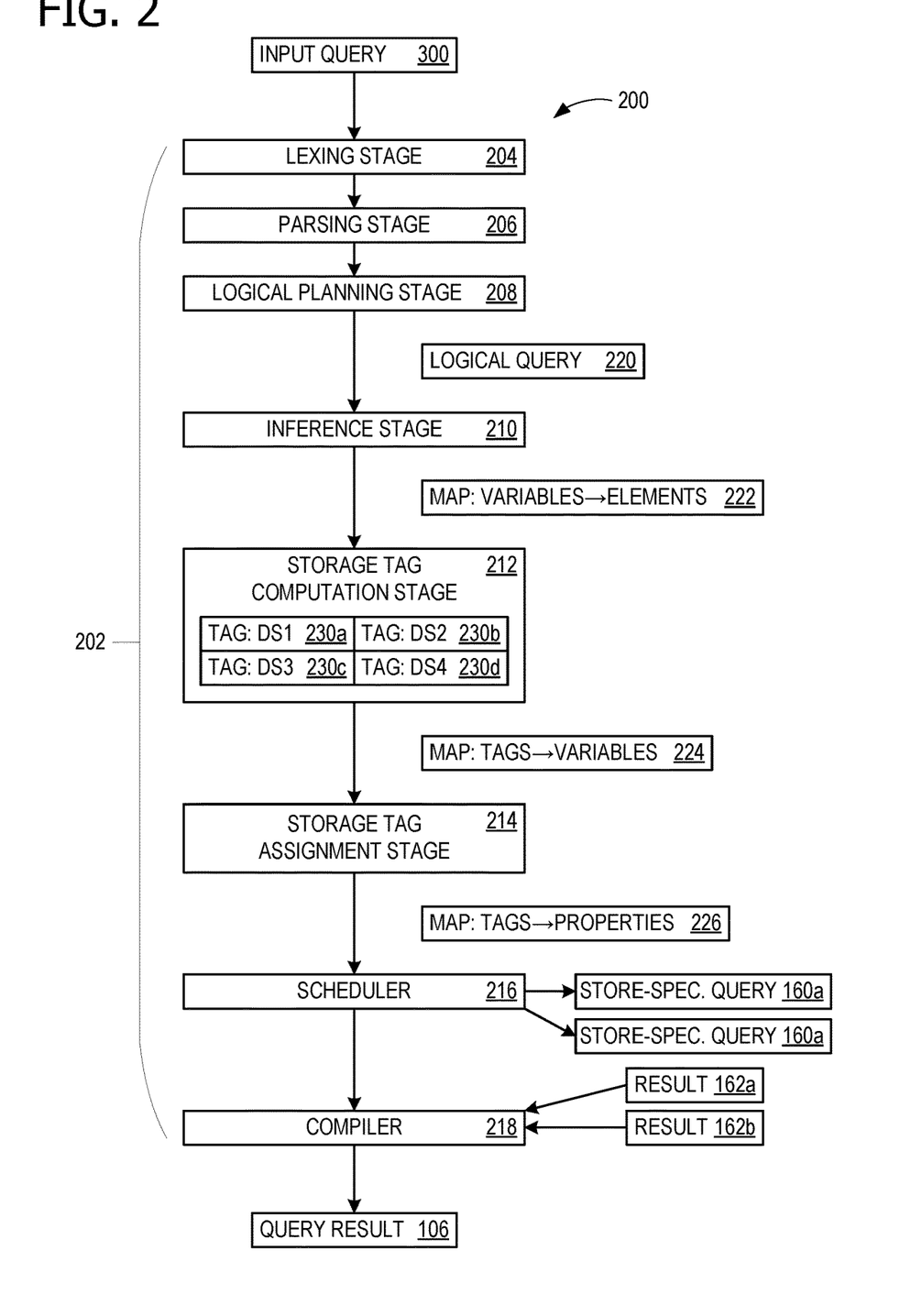
FIG. 2 illustrates an example query planner, such as may be used in the example architecture of FIG. 1.
Figure 6:
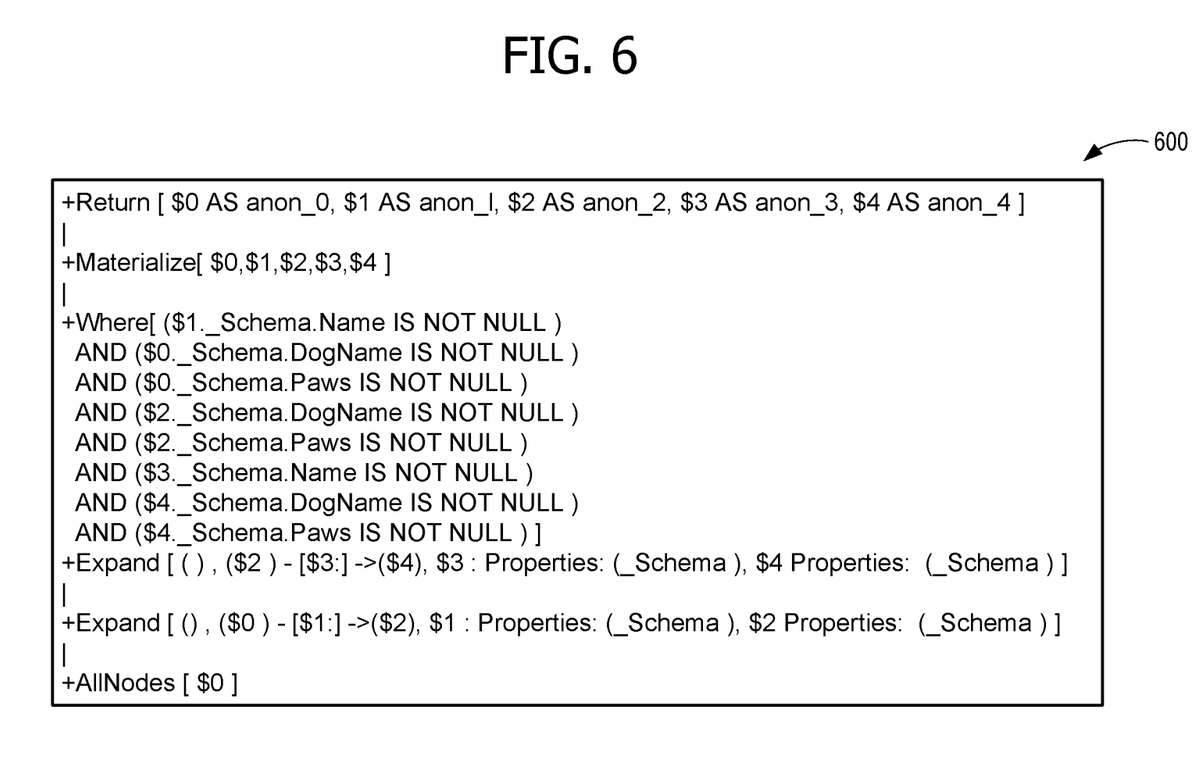
FIG. 6 illustrates an example meta-graph query, such as may be generated in the example architecture of FIG. 1.

FIG. 2 illustrates further detail for query planner 200, which implement a multi-stage query planning pipeline 202 that intakes input query 300 and outputs query result 106. The early stages of query planning pipeline 202, a lexing stage 204, a parsing stage 206, and a logical planning stage 208, convert input query 300 into a logical query 220 that may be expressed as an abstract syntax tree. Logical query 220 may be considered to be a meta-graph query, which is a query for meta-graph 122. A representative example output from logical planning stage 208 is shown in FIG. 6.

Lexing stage 204 uses a defined query grammar to break input query 300 into a stream of tokens. Parsing stage 206 identifies commands and statement in the output of lexing stage 204 for keywords and identifiers. Logical planning stage 208 trims the output of parsing stage 206 and converts it into a question form as logical query 220. Further stages of query planning pipeline 202 are capable of optimizing query scheduling by accounting for data-specific conditions (e.g., cardinality and size) and store-specific conditions (e.g., latency and placement), as described below, following the descriptions of FIGS. 3, 4, and 5.

Federation across data stores 150a-150d requires that sufficient information is derived regarding the intent of input query 300 to ensure correct scheduling of store-specific queries 160a and 160b. The query intent is specified through the language itself, using span predicates and select/filter statements. However, open-ended queries with vaguely specified intent present challenges. For example, the query: {MATCH (a); RETURN a} is a valid query, but does not specify intent. The correct query behavior for this is to include all entities found in public schema 400.

Inferring the intent of a federated graph query is a graph traversal problem, which can be modeled by repurposing logical query 220. To accomplish this, query planner 200 has the following requirements: (1) Queries should target public schema 400 and be transparently mapped and scheduled towards separate data stores; (2) query intent specified through a span/select should provide enough information to infer intent; and (3) Query planner 200 should ideally not inform restrictions of specificity of the query. This final item means that the open-ended query example above should be operable, although specific queries should perform better.

Turning briefly to FIG. 3, an example of input query 300 is shown as: MATCH (a:Dog) -[r]→(b)-[r1]→(c:Dog) RETURN r.Name, a.DogName, a.Paws, b.DogName, b.Paws, c.DogName, c.Paws, r1.Name This example has variables 110 as {a, r, b, r1, c}. Variables a and c are both specified as entity 112a, specifically as "Dog"; variable b is unspecified with a placeholder for an entity 112d, variable r is unspecified with a placeholder for a relationship 114c, and variable r1 is also unspecified with a placeholder for a relationship 114d. This example input query 300 induces some ambiguity by not specifying the intermediate types for r, b, and r1. They will therefore be inferred.

An unambiguous mapping between input query 300 (as parsed into logical query 220) and data structures within public schema 400 is required for proper, efficient scheduling across data stores 150a-150d. Inferring which entities input query 300 intends to map is essentially a graph problem.

FIG. 4 illustrates further detail for an example of public schema 400. Public schema 400 has elements 130, which include entities 112a-112c and relationships 114a and 114b. Entity 112a is shown as "Dog"; entity 112b is shown as "Person"; entity 112c is shown as "Bone"; relationship 114a is shown as "HasA" (meaning that one entity possesses another entity), and relationship 114b is shown as "FriendOf" (meaning that one entity is a friend of another entity). Relationship 114a is defined such that a Person may possess a Dog and a Dog may possess a Bone. Relationship 114b is defined such that a Dog may be a friend of another Dog.

Public schema 400 announces all visible entities and relationships that are retrievable in meta-graph 122, their types, connectedness, and storage location. FIG. 4 depicts an example public schema declaration in which entities, relationships, and their connectedness are expressed using C#syntax. Public schema 400 has a set of restrictions for specification. Entities and relationship types must be unique within public schema 400. No top-level entity relationship types may be defined twice. For a distinct type, properties thereof must be unique within that type. Across types, property names may overlap. Public schema 400 may map a property to any data store in which there exists a common identifier for indexing. A property may map to all data stores supporting that distinct data. If a property has more than one mapping, the multiple mappings must be semantically equivalent.

Figure 5:
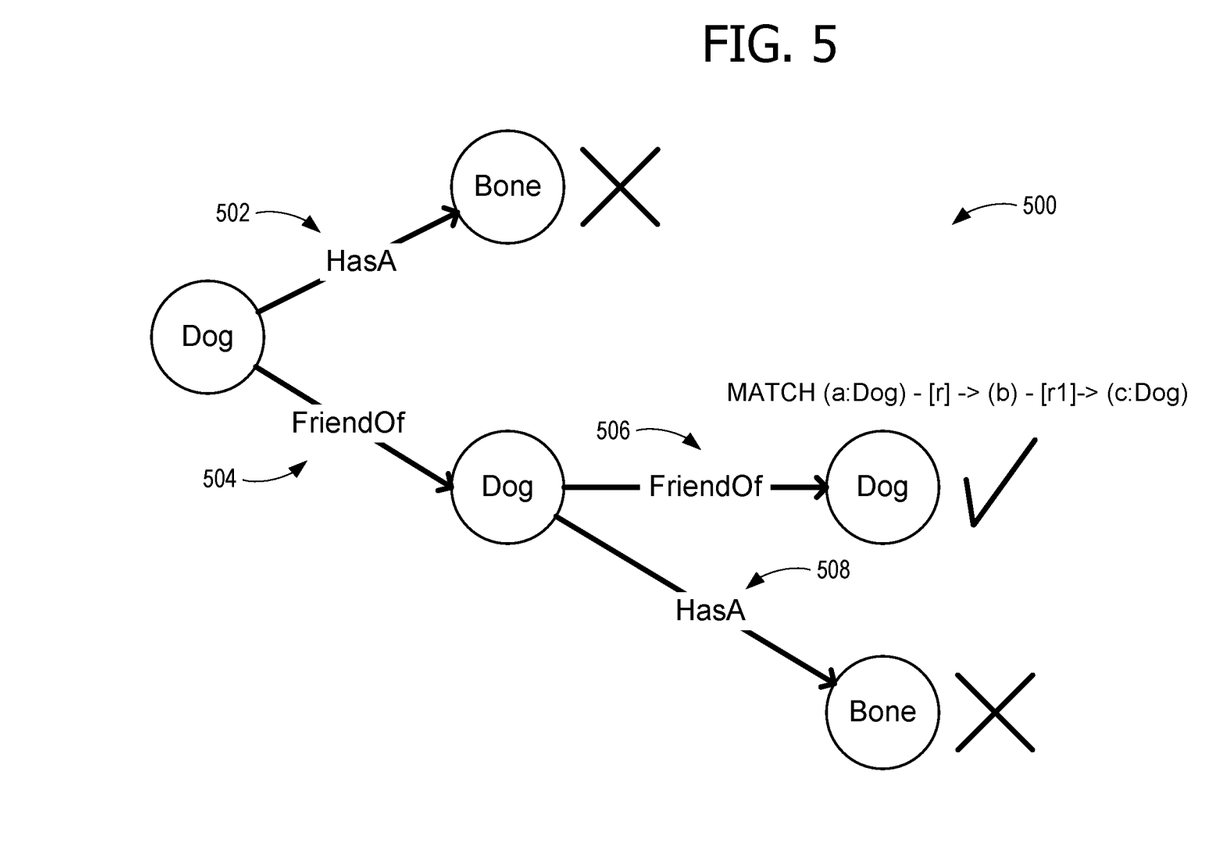
FIG. 5 illustrates an exemplary notional traversal of a meta-graph.

FIG. 5 illustrates anotional traversal 500 of meta-graph 122, given all possible spanning paths, to infer the intent of input query 300. Because r, b, and r1 are unspecified, all possible entity/relationship combinations are expanded at each step. A path 502, {(Dog)-[HasA]→(Bone)}, is invalid because there is no outbound relationship from Bone to satisfy r1. A path 504, {(Dog)-[FriendOf]→(Dog)}, is valid up through branching into paths 506 and 508, but the next sections will determine validity. Path 504/506, {(Dog)-[FriendOf]→(Dog)-[FriendOf]→(Dog)}, is valid, although Path 504/508 {(Dog)-[FriendOf]→(Dog)-[HasA]→(Bone)}, is invalid because node c (entity 112d) is specified to be a Dog. In this example query pattern, it is possible to infer the types without checking properties. However, when that is not possible, property assignments are used as a tie breaker.

Returning to FIG. 2, the further stages of query planning pipeline 202 are described. Query planning pipeline 202 has an inference stage 210, a storage tag computation stage 212, a storage tag assignment stage 214, a scheduler 216, and a compiler 218. Inference stage 210 outputs a mapping 222 that maps variables 110 of input query 300 to elements 130 of public schema 400. The mapping may be explicit for specified entities, or inferred for unspecified entities. An example of logical query 220 is shown in FIG. 6 as an abstract syntax tree 600.

Storage tag computation stage 212 determines the set of data stores to be scheduled for store-specific queries, given mapping 222. A storage tag is used to identify which of data stores 150a-150d possesses the tagged data. All selected data elements (e.g., variables 110) of input query 300 are tagged for at least one of data stores 150a-150d. The illustrated example has a storage tag 230a indicating data store 150a, a storage tag 230b indicating data store 150b, a storage tag 230c indicating data store 150c, and a storage tag 230d indicating data store 150d. Storage tag computation stage 212 outputs a mapping 224 that maps one of storage tags 230a-230d for each of variables 110 of input query 300.

Figure 7:
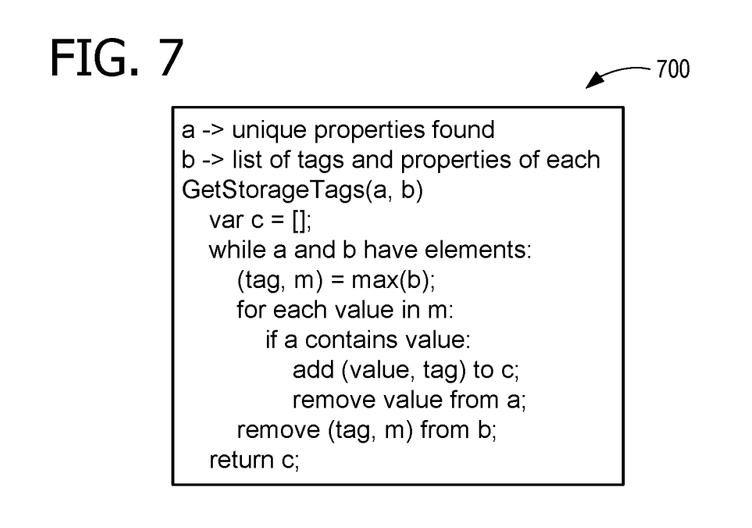
FIG. 7 illustrates an example pseudo code algorithm for determining storage tags, such as may be used in the example architecture of FIG. 1.

In some examples, the set of data stores is the smallest count of data stores that satisfies input query 300 (e.g., minimum set of data stores 164). One possible algorithm for computing minimum set of data stores 164 is shown in FIG. 7 as algorithm 700, using pseudocode.

Storage tag assignment stage 214 intakes mappings 222 and 224 and outputs a mapping 226 that maps one of storage tags 230a-230d to one of properties 302 of variables 110. A variable in variables 110 may have multiple properties. For example, variable "a" has properties DogName and Paws. Storage tag assignment stage 214 visits each select/process element in logical query 220 and uses mappings 222 and 224 to assign storage tags. Mapping 222 inspects the variable to schema entity map and mapping 224 identifies data store mapping via the mapped ones of storage tags 230a-230d. A property may be present in multiple tags, because multiple data stores may have overlapping data.

Figure 8:
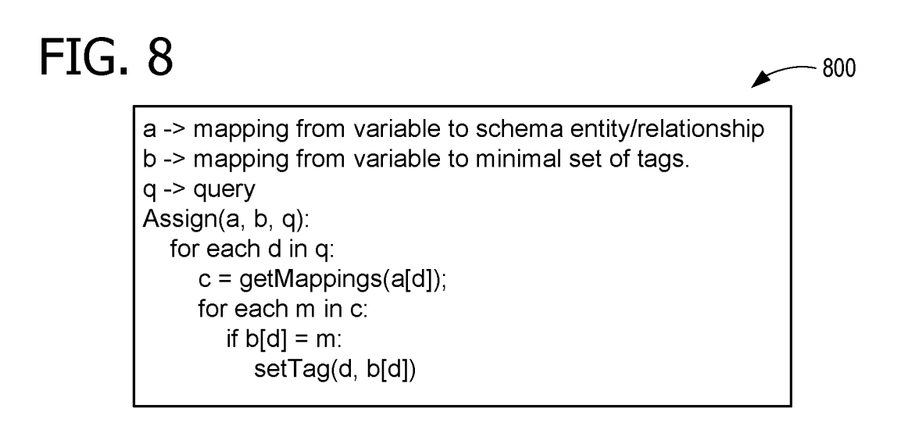
FIG. 8 illustrates an example pseudo code algorithm for storage tag assignment, such as may be used in the example architecture of FIG. 1.
Figure 9:
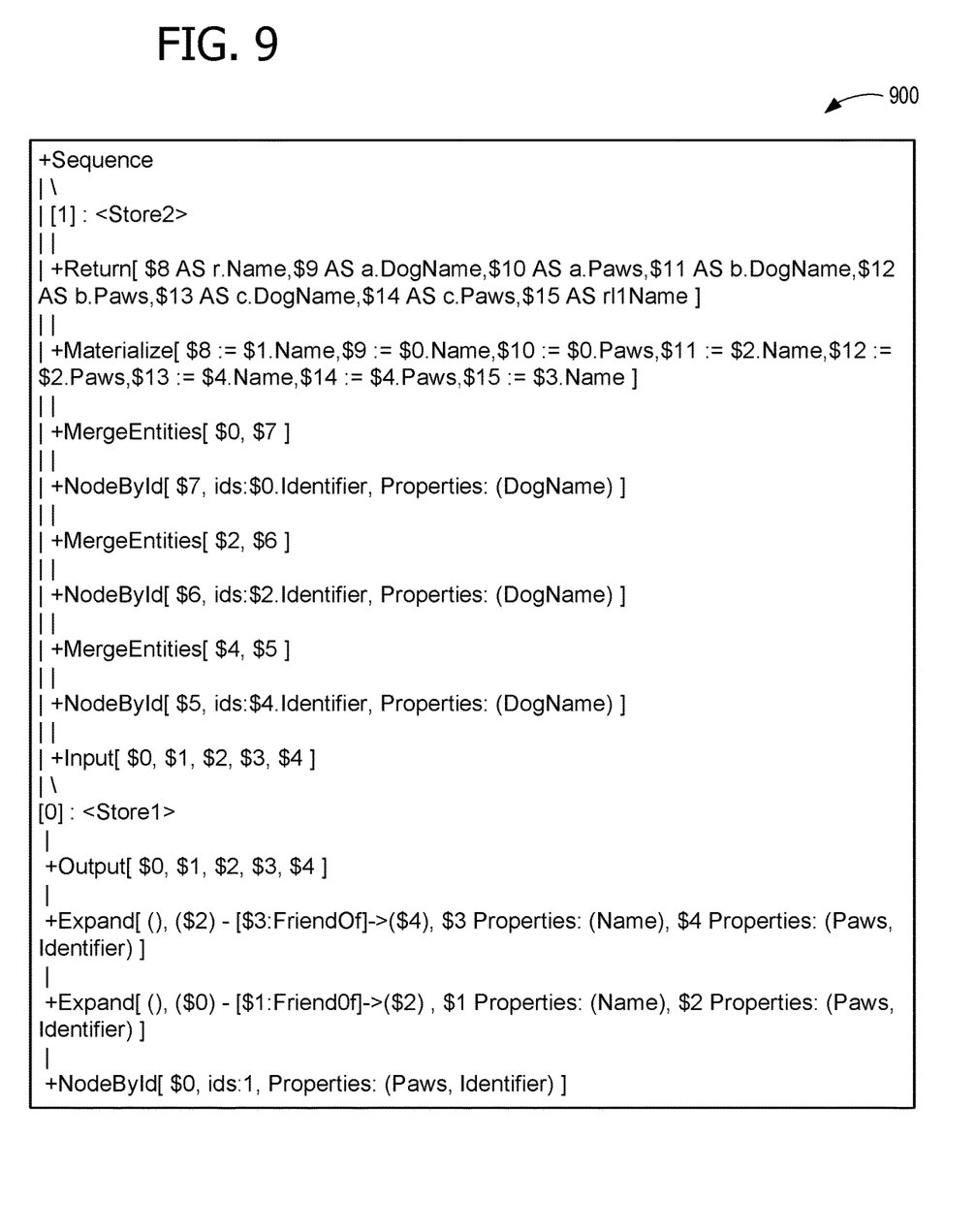
FIG. 9 illustrates an example output of a query planner of the example architecture of FIG. 1.

One possible algorithm for assigning storage tags is shown in FIG. 8 as algorithm 800, using pseudocode. Algorithm 800 has a loop that finds the storage tag with the most properties, and continues repeating until no properties are left untagged. Mapping 226 identifies which of storage tags 230a-230d is assigned to properties (or variables: a, r, b, r1, and c). An example is shown in FIG. 9 as an abstract syntax tree 900.

Scheduler 216 orchestrates and schedules store-specific queries 160a and 160b to individual stores. Data stores 150b and 150c each performs its respective store-specific query on its data set and returns its own query result. Compiler 218 receives and aggregates query results 162a and 162b into a coherent graph, and returns query result 106.)

Figure 10:
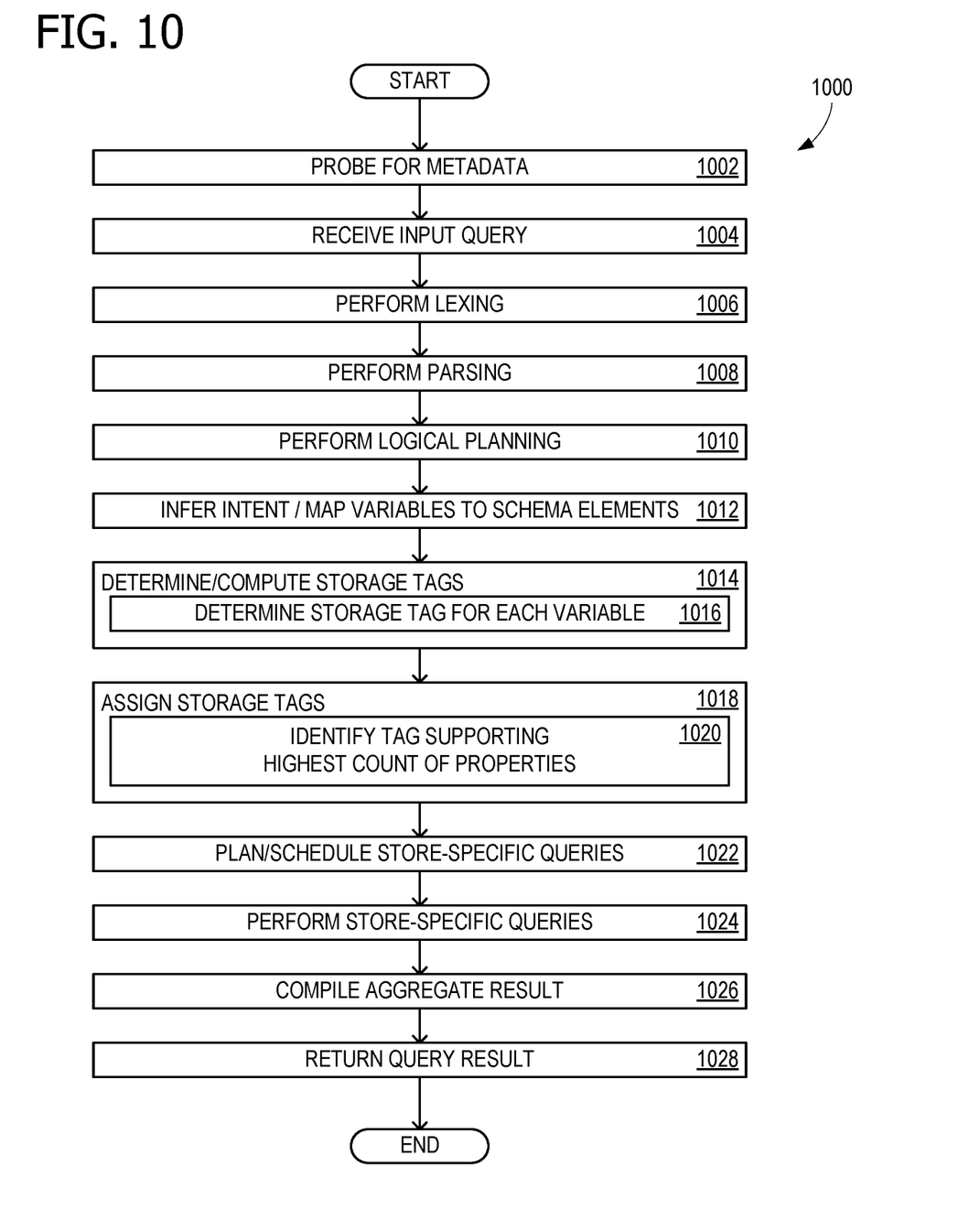
FIGS. 10 and 11 show flowcharts illustrating exemplary operations that may be performed when using example architectures, such as the architecture of FIG. 1.

FIG. 10 shows a flowchart 1000 illustrating exemplary operations that may be performed by architecture 100. In some examples, operations described for flowchart 1000 are performed by computing device 1200 of FIG. 12. Flowchart 1000 commences with dynamically probing metadata for elements 130 of public schema 400, in operation 1002.

In operation 1004, query service 120 receives input query 300. Operation 1006 performs lexing, operation 1008 performs parsing, and operation 1010 performs logical planning on input query 300. Performing lexing, parsing, and logical planning on input query 300 generates logical query 220.

Operation 1012 maps each of one or two (or even a larger number) variables 110 of input query 300 to elements 130 of public schema 400. This infers an intent of input query 300 and generates a meta-graph query. Operation 1012 uses mapping 222 of variables 110 of input query 300 to elements 130 of public schema 400 to determine which of storage tags 230a-230b to map to each of variables 110 of input query 300. In some examples, operation 1014 uses operation 1016, which maps variables 110 of input query 300 to minimum set of data stores 164. Some examples use latency metadata to map variables 110 to data stores, in order to minimize query latency. That is, operation 1016 determines a storage tag for each of variables 110 of input query 300 based on at least a latency associated with each of storage tags 230a-230b (i.e., associated with the data store identified by a storage tag).

Operation 1018 assigns storage tags 230a-230b to properties 302 of variables 110 of input query 300 based on at least mapping 224 of variables 110 of input query 300 to minimum set of data stores 164 and mapping 222 of variables 110 of input query 300 to elements 130 of public schema 400. In some examples, operation 1018 is performed using operation 1020, which identifies a storage tag supporting a highest count of properties 302.

Operation 1022 schedules store-specific queries 160a and 160b based on at least storage tags 230a-230b. Operation 1024 performs store-specific queries 160a and 160b. Operation 1026 compiles query result 106 from responses (e.g., query result 162a and 162b) to the store-specific queries 160a and 160b. Operation 1028 returns query result 106.

Figure 11:
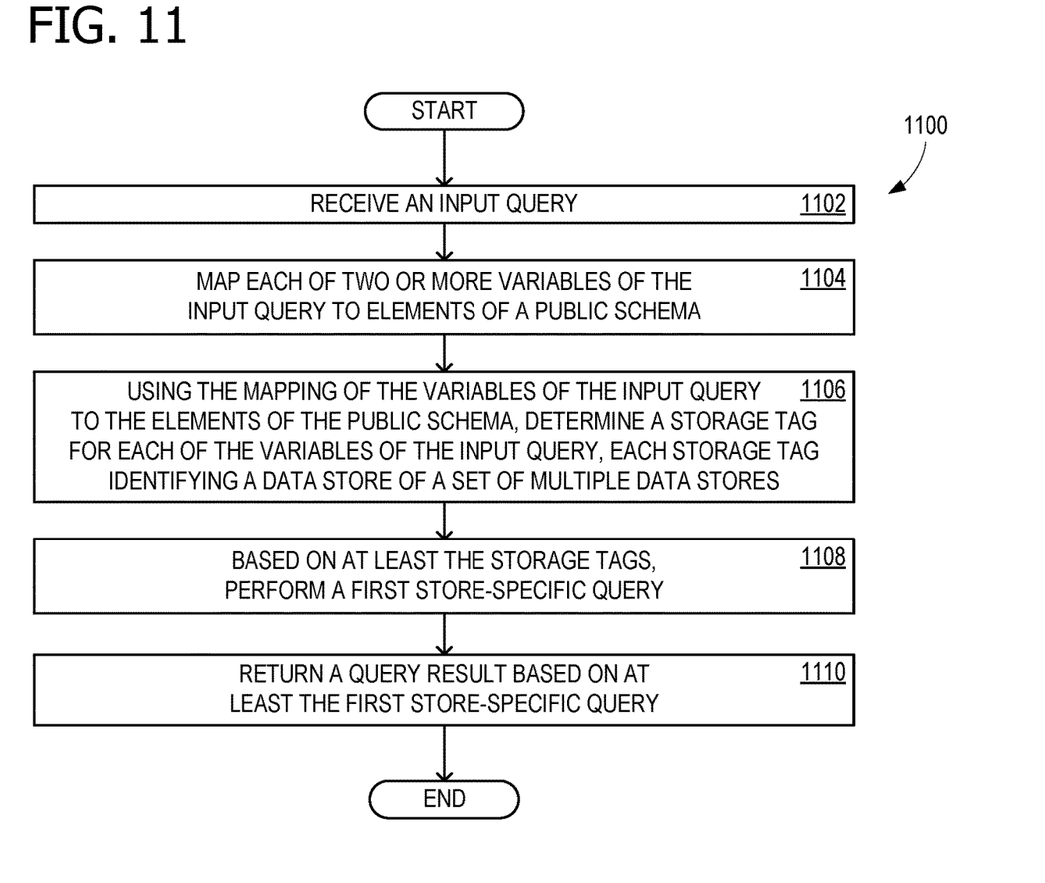

FIG. 11 shows a flowchart 1100 illustrating exemplary operations that may be performed by architecture 100. In some examples, operations described for flowchart 1100 are performed by computing device 1200 of FIG. 12. Flowchart 1100 commences with operation 1102, which includes receiving an input query. Operation 1104 includes mapping each of two or more variables of the input query to elements of a public schema. Operation 1106 includes, using the mapping of the variables of the input query to the elements of the public schema, determining a storage tag for each of the variables of the input query, each storage tag identifying a data store of a set of multiple data stores. Operation 1108 includes, based on at least the storage tags, performing a first store-specific query. Operation 1110 includes returning a query result based on at least the first store-specific query.

Additional Examples

An example system comprises: a processor; and a computer-readable medium storing instructions that are operative upon execution by the processor to: receive an input query; map each of two or more variables of the input query to elements of a public schema; using the mapping of the variables of the input query to the elements of the public schema, determine a storage tag for each of the variables of the input query, each storage tag identifying a data store of a set of multiple data stores; based on at least the storage tags, perform a first store-specific query; and return a query result based on at least the first store-specific query.

Another example system comprises: a processor; and a query service implemented on the processor and configured to: receive an input query from a user terminal via a network; map each of two or more variables of the input query to elements of a public schema; using the mapping of the variables of the input query to the elements of the public schema, determine a storage tag for each of the variables of the input query, each storage tag identifying a data store of a set of multiple data stores; based on at least the storage tags, perform a first store-specific query; and return a query result to the user terminal based on at least the first store-specific query.

An example computer-implemented method comprises: receiving an input query; mapping each of two or more variables of the input query to elements of a public schema; using the mapping of the variables of the input query to the elements of the public schema, determining a storage tag for each of the variables of the input query, each storage tag identifying a data store of a set of multiple data stores; based on at least the storage tags, performing a first store-specific query; and returning a query result based on at least the first store-specific query.

One or more example computer storage devices have computer-executable instructions stored thereon, which, on execution by a computer, cause the computer to perform operations comprising: receiving an input query; mapping each of two or more variables of the input query to elements of a public schema; using the mapping of the variables of the input query to the elements of the public schema, determining a storage tag for each of the variables of the input query, each storage tag identifying a data store of a set of multiple data stores; based on at least the storage tags, performing a first store-specific query; and returning a query result based on at least the first store-specific query.

Alternatively, or in addition to the other examples described herein, examples include any combination of the following:

- the variables of the input query comprise an entity and a relationship;
- determining a storage tag for each of the variables of the input query comprises mapping the variables of the input query to a minimum set of data stores;
- based on at least the mapping of the variables of the input query to the minimum set of data stores and the mapping of the variables of the input query to the elements of the public schema, assigning the storage tags to properties of the variables of the input query;
- assigning the storage tags to properties of the variables of the input query comprises identifying a storage tag supporting a highest count of properties;
- based on at least the storage tags, scheduling two or more store-specific queries including the first store-specific query;
- compiling the query result from responses to the two or more store-specific queries;
- determining a storage tag for each of the variables of the input query comprises determining a storage tag for each of the variables of the input query based on at least a latency associated with each of the storage tags;
- the input query comprises variables;
- further comprising performing lexing, parsing, and logical planning on the input query;
- performing lexing, parsing, and logical planning on the input query generates a logical query;
- the logical query comprises an abstract syntax tree;

the mapping of the variables of the input query to the elements of the public schema is performed on the logical query;

the mapping of the variables of the input query to the elements of the public schema comprises an abstract syntax tree;

mapping variables of the input query to elements of a public schema comprises generating a meta-graph query;

mapping variables of the input query to elements of a public schema comprises inferring an intent of the input query;

the variables of the input query comprise entities and relationships;

the public schema indicates types, connectedness, and/or storage locations of the variables;

the public schema indicates entities and relationships visible in a federated graph;

metadata for elements of the public schema includes cardinality, access control information, privacy classification, data store latency, and/or information on data overlap among data stores;

the elements of the public schema comprise entities and relationships;

further comprising dynamically probing metadata for elements of the public schema; and performing the two or more store-specific queries.

While the aspects of the disclosure have been described in terms of various examples with their associated operations, a person skilled in the art would appreciate that a combination of operations from any number of different examples is also within scope of the aspects of the disclosure.

Example Operating Environment

Figure 12:
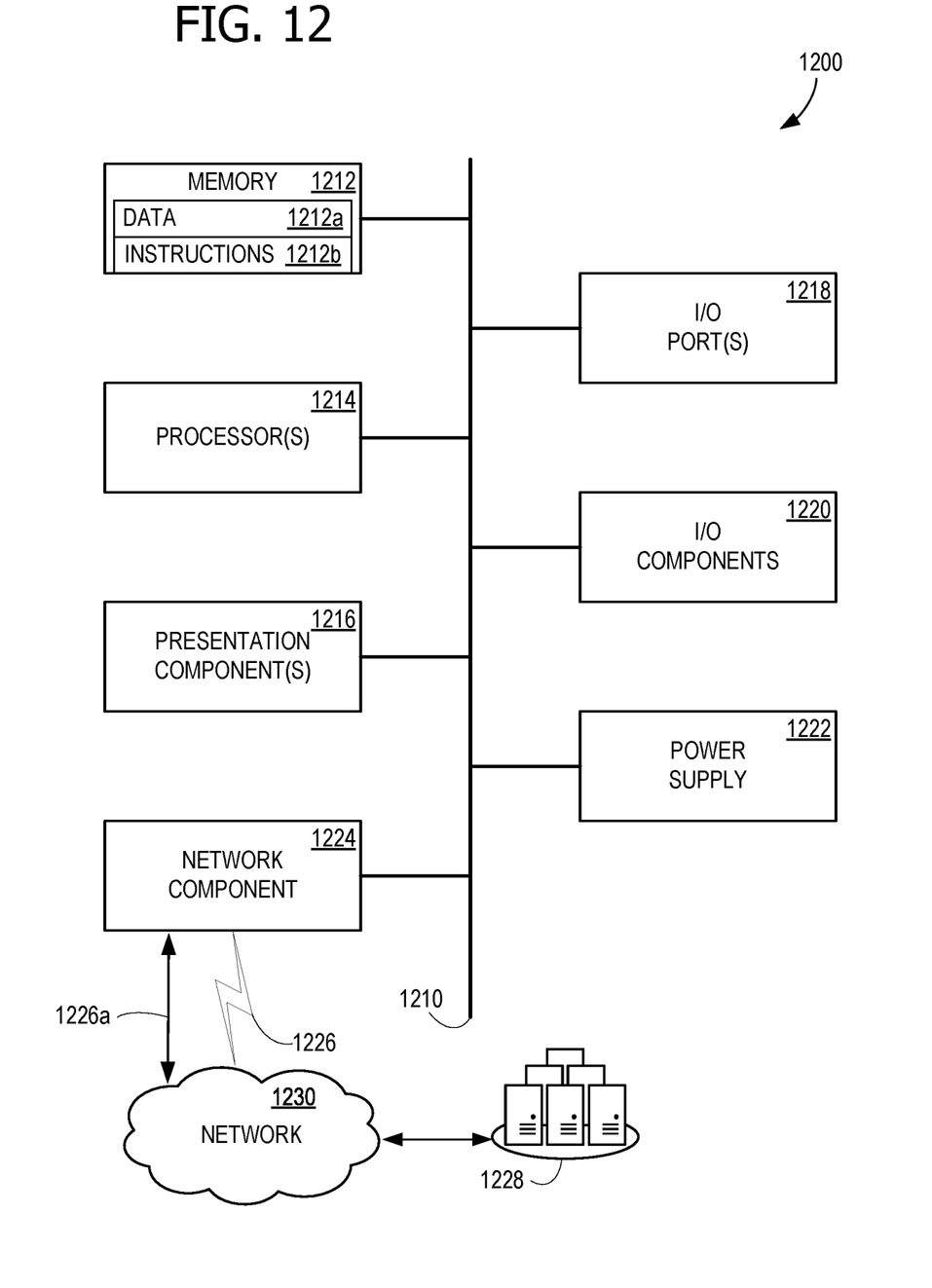
FIG. 12 shows a block diagram of an example computing device suitable for implementing some of the various examples disclosed herein.

FIG. 12 is a block diagram of an example computing device 1200 (e.g., a computer storage device) for implementing aspects disclosed herein, and is designated generally as computing device 1200. In some examples, one or more computing devices 1200 are provided for an on-premises computing solution. In some examples, one or more computing devices 1200 are provided as a cloud computing solution. In some examples, a combination of on-premises and cloud computing solutions are used. Computing device 1200 is but one example of a suitable computing environment and is not intended to suggest any limitation as to the scope of use or functionality of the examples disclosed herein, whether used singly or as part of a larger set.

Neither should computing device 1200 be interpreted as having any dependency or requirement relating to any one or combination of components/modules illustrated. The examples disclosed herein may be described in the general context of computer code or machine-useable instructions, including computer-executable instructions such as program components, being executed by a computer or other machine, such as a personal data assistant or other handheld device. Generally, program components including routines, programs, objects, components, data structures, and the like, refer to code that performs particular tasks, or implement particular abstract data types. The disclosed examples may be practiced in a variety of system configurations, including personal computers, laptops, smart phones, mobile tablets, hand-held devices, consumer electronics, specialty computing devices, etc. The disclosed examples may also be practiced in distributed computing environments when tasks are performed by remote-processing devices that are linked through a communications network.

Computing device 1200 includes a bus 1210 that directly or indirectly couples the following devices: computer storage memory 1212, one or more processors 1214, one or more presentation components 1216, input/output (I/O) ports 1218, I/O components 1220, a power supply 1222, and a network component 1224. While computing device 1200 is depicted as a seemingly single device, multiple computing devices 1200 may work together and share the depicted device resources. For example, memory 1212 may be distributed across multiple devices, and processor(s) 1214 may be housed with different devices.

Bus 1210 represents what may be one or more busses (such as an address bus, data bus, or a combination thereof). Although the various blocks of FIG. 12 are shown with lines for the sake of clarity, delineating various components may be accomplished with alternative representations. For example, a presentation component such as a display device is an I/O component in some examples, and some examples of processors have their own memory. Distinction is not made between such categories as "workstation," "server," "laptop," "hand-held device," etc., as all are contemplated within the scope of FIG. 12 and the references herein to a "computing device." Memory 1212 may take the form of the computer storage media referenced below and operatively provide storage of computer-readable instructions, data structures, program modules and other data for the computing device 1200. In some examples, memory 1212 stores one or more of an operating system, a universal application platform, or other program modules and program data. Memory 1212 is thus able to store and access data 1212$a$ and instructions 1212$b$ that are executable by processor 1214 and configured to carry out the various operations disclosed herein.

In some examples, memory 1212 includes computer storage media. Memory 1212 may include any quantity of memory associated with or accessible by the computing device 1200. Memory 1212 may be internal to the computing device 1200 (as shown in FIG. 12), external to the computing device 1200 (not shown), or both (not shown). Additionally, or alternatively, the memory 1212 may be distributed across multiple computing devices 1200, for example, in a virtualized environment in which instruction processing is carried out on multiple computing devices 1200. For the purposes of this disclosure, "computer storage media," "computer storage memory," "memory," and "memory devices" are synonymous terms for the memory 1212, and none of these terms include carrier waves or propagating signaling.

Processor(s) 1214 may include any quantity of processing units that read data from various entities, such as memory 1212 or I/O components 1220. Specifically, processor(s) 1214 are programmed to execute computer-executable instructions for implementing aspects of the disclosure. The instructions may be performed by the processor, by multiple processors within the computing device 1200, or by a processor external to the client computing device 1200. In some examples, the processor(s) 1214 are programmed to execute instructions such as those illustrated in the flow charts discussed below and depicted in the accompanying drawings. Moreover, in some examples, the processor(s) 1214 represent an implementation of analog techniques to perform the operations described herein. For example, the operations may be performed by an analog client computing device 1200 and/or a digital client computing device 1200. Presentation component(s) 1216 present data indications to a user or other device. Exemplary presentation components include a display device, speaker, printing component, vibrating component, etc. One skilled in the art will understand and appreciate that computer data may be presented in a number of ways, such as visually in a graphical user interface (GUI), audibly through speakers, wirelessly between computing devices 1200, across a wired connection, or in other ways. I/O ports 1218 allow computing device 1200 to be logically coupled to other devices including I/O components 1220, some of which may be built in. Example I/O components 1220 include, for example but without limitation, a microphone, joystick, game pad, satellite dish, scanner, printer, wireless device, etc.

Computing device 1200 may operate in a networked environment via the network component 1224 using logical connections to one or more remote computers. In some examples, the network component 1224 includes a network interface card and/or computer-executable instructions (e.g., a driver) for operating the network interface card. Communication between the computing device 1200 and other devices may occur using any protocol or mechanism over any wired or wireless connection. In some examples, network component 1224 is operable to communicate data over public, private, or hybrid (public and private) using a transfer protocol, between devices wirelessly using short range communication technologies (e.g., near-field communication (NFC), Bluetooth™ branded communications, or the like), or a combination thereof. Network component 1224 communicates over wireless communication link 1226 and/or a wired communication link 1226a to a remote resource 1228 (e.g., a cloud resource) across network 1230. Various different examples of communication links 1226 and 1226a include a wireless connection, a wired connection, and/or a dedicated link, and in some examples, at least a portion is routed through the internet.

Although described in connection with an example computing device 1200, examples of the disclosure are capable of implementation with numerous other general-purpose or special-purpose computing system environments, configurations, or devices. Examples of well-known computing systems, environments, and/or configurations that may be suitable for use with aspects of the disclosure include, but are not limited to, smart phones, mobile tablets, mobile computing devices, personal computers, server computers, hand-held or laptop devices, multiprocessor systems, gaming consoles, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, virtual reality (VR) devices, augmented reality (AR) devices, mixed reality devices, holographic device, and the like. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein. In examples involving a general-purpose computer, aspects of the disclosure transform the general-purpose computer into a special-purpose computing device when configured to execute the instructions described herein.

By way of example and not limitation, computer readable media comprise computer storage media and communication media. Computer storage media include volatile and nonvolatile, removable and non-removable memory implemented in any method or technology for storage of information such as computer readable instructions, data structures, program modules, or the like. Computer storage media are tangible and mutually exclusive to communication media. Computer storage media are implemented in hardware and exclude carrier waves and propagated signals. Computer storage media for purposes of this disclosure are not signals per se. Exemplary computer storage media include hard disks, flash drives, solid-state memory, phase change random-access memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. In contrast, communication media typically embody computer readable instructions, data structures, program modules, or the like in a modulated data signal such as a carrier wave or other transport mechanism and include any information delivery media.

The order of execution or performance of the operations in examples of the disclosure illustrated and described herein is not essential, and may be performed in different sequential manners in various examples. For example, it is contemplated that executing or performing a particular operation before, contemporaneously with, or after another operation is within the scope of aspects of the disclosure. When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:
a processor; and
a query service implemented on the processor and configured to:
receive an input query from a user terminal via a network, the input query comprising a plurality of variables;
map each of the plurality of variables of the input query to elements of a public schema, wherein the elements of the public schema comprise entities and relationships;
identify a minimum set of multiple data stores for a plurality of store-specific queries, wherein the minimum set of multiple data stores comprises a smallest number of data stores to be searched to satisfy the input query;
map the plurality of variables of the input query to the minimum set of multiple data stores;
using the mapping of the plurality of variables of the input query to the minimum set of multiple data stores and the mapping of the plurality of variables of the input query to the elements of the public schema, assign storage tags to properties of the plurality of variables of the input query, each storage tag identifying a data store of the minimum set of multiple data stores;
based on at least the storage tags, perform the plurality of store-specific queries; and
return a query result to the user terminal based on at least the plurality of store-specific queries.

2. The system of claim 1, wherein the variables of the input query comprise an entity and a relationship.

3. The system of claim 1, wherein the public schema comprises metadata associated with the elements.

4. The system of claim 3, wherein the metadata associated with the elements includes cardinality, access control information, privacy classification, or expected data store latency.

5. The system of claim 1, wherein assigning the storage tags to the properties of the variables of the input query comprises:
identifying a storage tag supporting a highest count of the properties.

6. The system of claim 1, wherein the query service further configured to:
compile the query result from responses to the plurality of store-specific queries.

7. The system of claim 1, wherein determining the storage tag for each of the variables of the input query comprises:
determining the storage tag for each of the variables of the input query based on at least a latency associated with each of the storage tags.

8. A computer-implemented method comprising:
receiving an input query comprising a plurality of variables;
mapping each of the plurality of variables of the input query to elements of a public schema, wherein the elements of the public schema comprise entities and relationships;
identifying a minimum set of multiple data stores for a plurality of store-specific queries, wherein the minimum set of multiple data stores comprises a smallest number of data stores to be searched to satisfy the input query;
mapping the plurality of variables of the input query to the minimum set of multiple data stores;
using the mapping of the plurality of variables of the input query to the minimum set of multiple data stores and the mapping of the plurality of variables of the input query to the elements of the public schema, assigning storage tags to properties of the plurality of variables of the input query, each storage tag identifying the minimum data store of a set of multiple data stores;
based on at least the storage tags, performing the plurality of store-specific queries; and
returning a query result based on at least the plurality of store-specific queries.

9. The computer-implemented method of claim 8, wherein the variables of the input query comprise an entity and a relationship.

10. The computer-implemented method of claim 8, wherein the public schema comprises metadata associated with the elements.

11. The computer-implemented method of claim 10, wherein the metadata associated with the elements includes cardinality, access control information, privacy classification, or expected data store latency.

12. The computer-implemented method of claim 8, wherein assigning the storage tags to the properties of the variables of the input query comprises:
identifying a storage tag supporting a highest count of the properties.

13. The computer-implemented method of claim 8, further comprising:
compiling the query result from responses to the plurality of store-specific queries.

14. The computer-implemented method of claim 8, wherein determining the storage tag for each of the variables of the input query comprises:
determining the storage tag for each of the variables of the input query based on at least a latency associated with each of the storage tags.

15. A computer storage device having computer-executable instructions stored thereon, which, on execution by a computer, cause the computer to perform operations comprising:
receiving an input query comprising a plurality of variables, the plurality of variables comprising an entity and a relationship;
mapping each of the plurality of variables of the input query to elements of a public schema, wherein the elements of the public schema comprise entities and relationships;
identifying a minimum set of multiple data stores for a plurality of store-specific queries, wherein the minimum set of multiple data stores comprises a smallest number of data stores to be searched to satisfy the input query;
mapping the plurality of variables of the input query to the minimum set of multiple data stores;
using the mapping of the plurality of variables of the input query to the minimum set of multiple data stores and the mapping of the plurality of variables of the input query to the elements of the public schema, assigning storage tags to properties of the plurality of variables of the input query, each storage tag identifying a data store of the minimum set of multiple data stores;
based on at least the storage tags, performing the plurality of store-specific queries; and
returning a query result based on at least the first plurality of store-specific queries.

16. The computer storage device of claim 15, wherein the public schema comprises metadata associated with the elements.

17. The computer storage device of claim 16, wherein the metadata associated with the elements includes cardinality, access control information, privacy classification, or expected data store latency.

18. The computer storage device of claim 15, wherein assigning the storage tags to the properties of the variables of the input query comprises:
   identifying a storage tag supporting a highest count of the properties.

19. The computer storage device of claim 15, wherein the operations further comprise:
   compiling the query result from responses to the plurality of store-specific queries.

20. The computer storage device of claim 15, wherein determining the storage tag for each of the variables of the input query comprises:
   determining the storage tag for each of the variables of the input query based on at least a latency associated with each of the storage tags.

* * * * *